(No Model.)

E. C. OHMART.
DEVICE FOR REFLECTING AND REFRACTING RADIANT ENERGY.

No. 504,890. Patented Sept. 12, 1893.

WITNESSES
Frank G. Parker
William P. Parry

INVENTOR
Eli C. Ohmart
by his attorney
Aly. L. Hayes

UNITED STATES PATENT OFFICE.

ELI C. OHMART, OF DETROIT, MICHIGAN, ASSIGNOR, BY MESNE ASSIGNMENTS, TO FRANCIS DOANE, CHARLES F. CROWELL, AND MELVIN L. SEVERY, TRUSTEES, OF BOSTON, MASSACHUSETTS.

DEVICE FOR REFLECTING AND REFRACTING RADIANT ENERGY.

SPECIFICATION forming part of Letters Patent No. 504,890, dated September 12, 1893.

Application filed February 24, 1890. Serial No. 341,436. (No model.)

*To all whom it may concern:*

Be it known that I, ELI C. OHMART, of Detroit, in the county of Wayne and State of Michigan, have invented a new and useful Improvement in Devices for Reflecting and Refracting Radiant Energy, of which the following, taken in connection with the accompanying drawings, is a specification.

The object of this invention is the production, in devices for reflecting or refracting radiant energy, of curved surfaces by means which enables such surfaces to be formed more expeditiously, cheaply, and of larger size than heretofore.

To this end the invention consists, first, in a chamber having a curved reflecting surface, which surface is given the desired curvature by establishing a difference of pressure between the contents of the chamber and the external medium, as will be hereinafter more fully set forth; second, in a chamber having a curved surface or surfaces forming the boundary or boundaries to a refracting medium within the chamber, which surface is given the desired curvature by establishing a difference of pressure between the contents of the chamber and the external medium, as will be hereinafter more fully set forth; third, in the combination with a chamber having a curved reflecting surface, or a curved surface or surfaces forming the boundary or boundaries to a gaseous or liquid refracting medium within the chamber, of a compensating device connected therewith whereby the contents of the chamber can be maintained at a uniformity density notwithstanding the changes in temperature or the barometric changes to which the contents of the chamber are exposed; fourth, in the combination with the above described chamber of a compensating chamber connected therewith, and means for varying at will the pressure in the said chamber, whereby the contents of the first mentioned chamber can be maintained at a uniform density, notwithstanding the changes in temperature, or the barometric changes to which the contents of this chamber are exposed.

In the accompanying drawings I have shown several devices which embody the principle of my invention.

Figure 1:
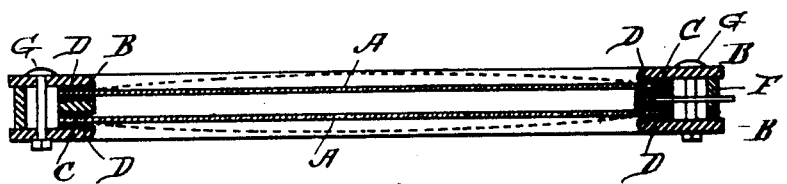
Figure 2:
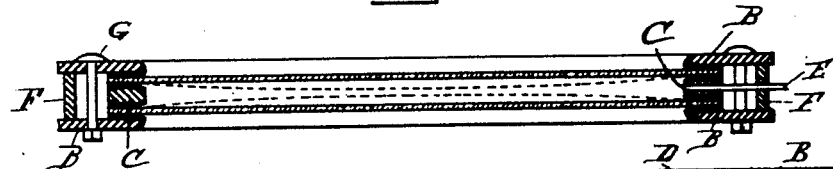
Figure 7:
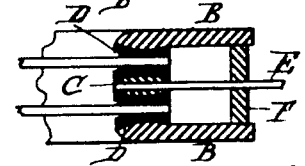
Figure 4:
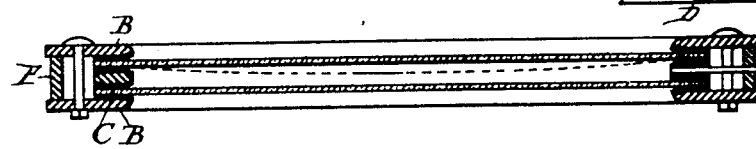
Figures 3, 5:
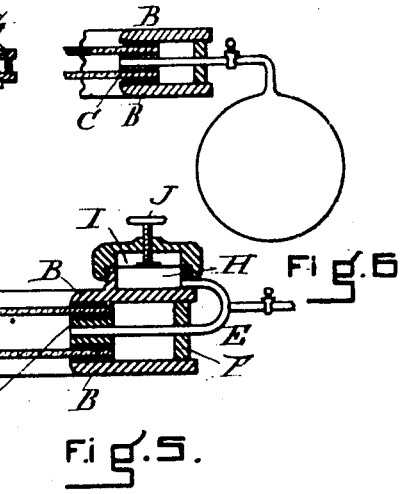

In the drawings—Figure 1, is a sectional view of a chamber transmittant to radiant energy and representing curved surfaces which are concave to one another. Fig. 2, is a sectional view of a chamber transmittant to radiant energy and representing curved surfaces which are convex to one another. Fig. 3, is a sectional view of a chamber illustrating one curved surface transmittant to radiant energy. Fig. 4, is a sectional view of a chamber illustrating a curved reflecting surface. Fig. 5, is a sectional view of the compensating chamber. Fig. 6, is a sectional view of another form of compensating device. Fig. 7, is a sectional view of the packing rings.

In the several figures like letters refer to corresponding parts.

The chambers which are transmittant to radiant energy are formed of two parallel flexible or elastic plates, or membranes, of any suitable substance transmittant to the form of radiant energy which is to be refracted, each having its sides parallel,—said plates or membranes being supported at any desired distance from one another in a ring and hermetically sealed therein. When it is desired that these plates should be concave to one another, the space between the plates is filled under pressure with any gas or liquid denser or rarer than the surrounding medium according as it is intended to produce convergence or divergence, and this pressure causes the surfaces to become curved. If it is intended to produce surfaces convex to one another the chamber is wholly or partially exhausted of its previous contents until the pressure of the external medium upon the elastic and yielding plates causes the required convexity. In this case the chamber may be filled with any suitable gas or liquid, or a vacuum may be formed in any manner, within the chamber. The same principle can be carried into effect in the production of curved reflecting surfaces, either convex or concave; and this result, may be accomplished by the use, for one of the walls of the chamber, of an elastic and yielding plate suitably silvered and then producing the desired curvature in this plate by causing a difference of pressure between the contents of the chamber and the surrounding medium. The walls of the chamber may be made of glass and the chamber be filled with mercury, or any other reflecting substance for the form of radiant energy which is to be reflected, as this invention is applicable to devices for reflecting any form of radiant energy; or the curved wall may be itself the reflecting surface, or be silvered.

The accompanying drawings shows a device by means of which my invention is carried into effect.

A, A are two plates preferably of any elastic material transmittant to the form of radiant energy which is to be refracted, as for example, for light I use plates of glass. The surfaces of these plates are parallel, and the plates are parallel to one another.

B B are two external rings of metal, or of other suitable material, which project beyond the edges of the plates, and C is the central ring between the plates and the external rings. This ring C is of less width horizontally than the rings B, B, and it may be of any desired vertical width, as for example, of the width shown in Fig. 3, where the ring is shown as conical.

Between the rings and the edges of the plates are placed rings D D of some suitable packing material which forms a packing hermetically tight to the contents of the chambers, and also permits the edges of the plates to yield when the plates are curved by the pressure from within or from without.

Inserted in the ring C, and communicating with the chamber is a tube E, by means of which any gas or liquid used as the refracting medium may be introduced into the chamber under pressure, or by means of which the chamber can be exhausted. This tube is capable of being hermetically sealed.

F is a ring which is placed around the rings B B, and G is a suitable screw by means of which the rings can be clamped together. The tube E passes through the ring F.

It is preferable that the faces of these rings D D and C should be convex as shown in Fig. 7, thus permitting the edges of the plates when the plates are pressed upon either outwardly or inwardly to conform to the surface of the ring. It is desirable that the inner surface of the rings B B should be convex for the same reasons.

Any other device may be used for clamping the plates together.

The liquid or gas used as the refracting medium is supplied under pressure by means of any suitable air compressor, or by a pump, and the plates are thus caused to bulge outward, as shown in dotted lines in Fig. 1. When the desired convexity is obtained the tube is closed, or sealed. When the contents of the chamber are exhausted the plates become concave as shown in dotted lines in Fig. 2.

For the reason that the plates have parallel surfaces radiant energy will pass through the plates without convergence or divergence and they serve merely as boundary surfaces to the refracting medium contained in the chamber.

For the reason that variation in temperature and barometric changes will produce variations in the density, or pressure of the contents of the chamber, I provide a device by means of which the contents of the chamber may be maintained at a uniform pressure. This device consists of a small chamber H, which is in communication with the larger chamber and has one of its walls formed by an elastic diaphragm I, which can be depressed at will by means of a set screw J. Or the device may be any other suitable compensating chamber as for example the device shown in an application for a patent of the United States previously filed by me, October 30, 1889, Serial No. 328,648, shown in Fig. 6, and consists of a bulb of any suitable material communicating with the chamber so that when the contents of the chamber expand the bulb in communication therewith will expand and receive a portion of the contents of the larger chamber. Such a compensating device can be applied to any lenses containing liquids or gases.

In the chamber shown in Fig. 3, only one of the plates is curved, for the reason that the focus is formed within the refracting medium contained in the chamber. In this chamber the surface upon which the rays are incident will be convex or concave according as the pressure in the chamber is greater or less than the surrounding medium.

Having thus described my invention, what I claim, and desire to secure by Letters Patent of the United States, is—

1. In a device for refracting or reflecting radiant energy, a chamber inclosing a fluid and having a curved surface or surfaces, the convexity or concavity of the surface or surfaces being maintained by a difference of pressure between the inclosed and the external media, substantially as shown and described.

2. The combination, substantially as and for the purpose set forth, of two opposed flexible or elastic plates separated from one another, a suitable wall or ring embracing the edges of said plates, and means for establishing a difference of pressure between the medium inclosed by those plates and the medium in juxtaposition to their outer surfaces.

3. The combination, substantially as and for the purpose set forth, of the opposed flexible or elastic plates A, A, having surfaces parallel to one another, the rings B B, the ring C, the packing rings D D, the tube E, the ring F, and the screws G.

4. The combination, substantially as and for the purpose set forth, of the parallel flexible or elastic plates A, A, having surfaces parallel to one another, the rings B B convex on their inner sides, the ring C convex on its sides, and the packing rings D, D, convex on their faces.

5. The combination, substantially as and for the purpose set forth, of a chamber having a curved surface or surfaces, a secondary chamber connected with the first-mentioned chamber, a movable wall to the secondary chamber, and a device for moving said wall.

6. The combination, substantially as, and for the purpose set forth, with the chamber formed by opposed flexible or elastic plates having their edges clamped by a suitable wall or ring, of the secondary chamber communicating with the first-mentioned chamber, the movable diaphragm I forming one of the walls of the secondary chamber, and a screw, for moving the diaphragm.

7. A mirror consisting of an air tight box closed by a flexible reflecting diaphragm.

8. A mirror consisting of an air tight box closed by a flexible reflecting diaphragm, and means for introducing a fluid into the box.

In testimony whereof I have signed my name to this specification, in the presence of two subscribing witnesses, on this 17th day of February, A. D. 1890.

ELI C. OHMART.

Witnesses:
MELVIN L. SEVERY,
W. S. NISHER.